United States Patent Office 3,453,720
Patented July 8, 1969

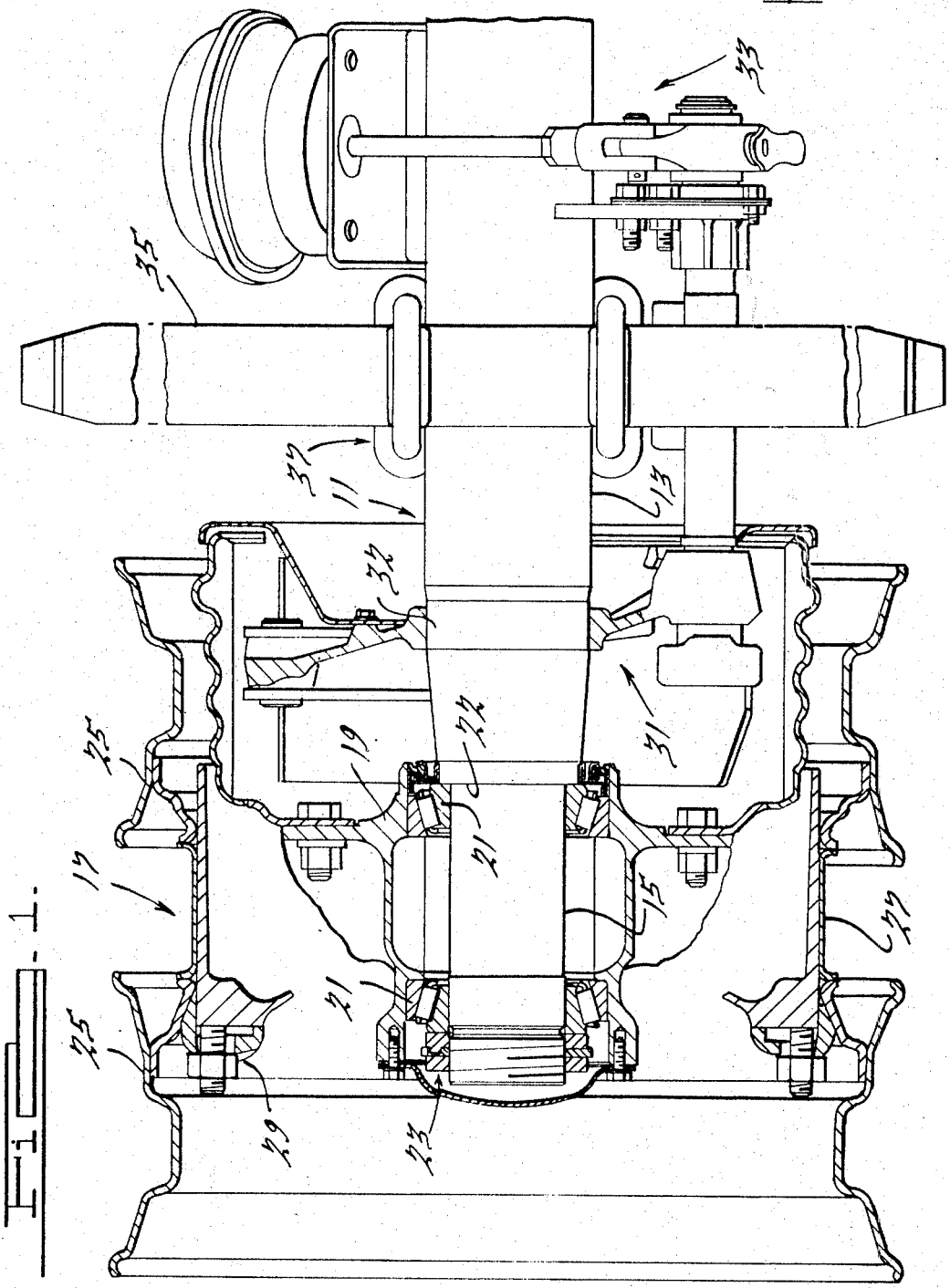

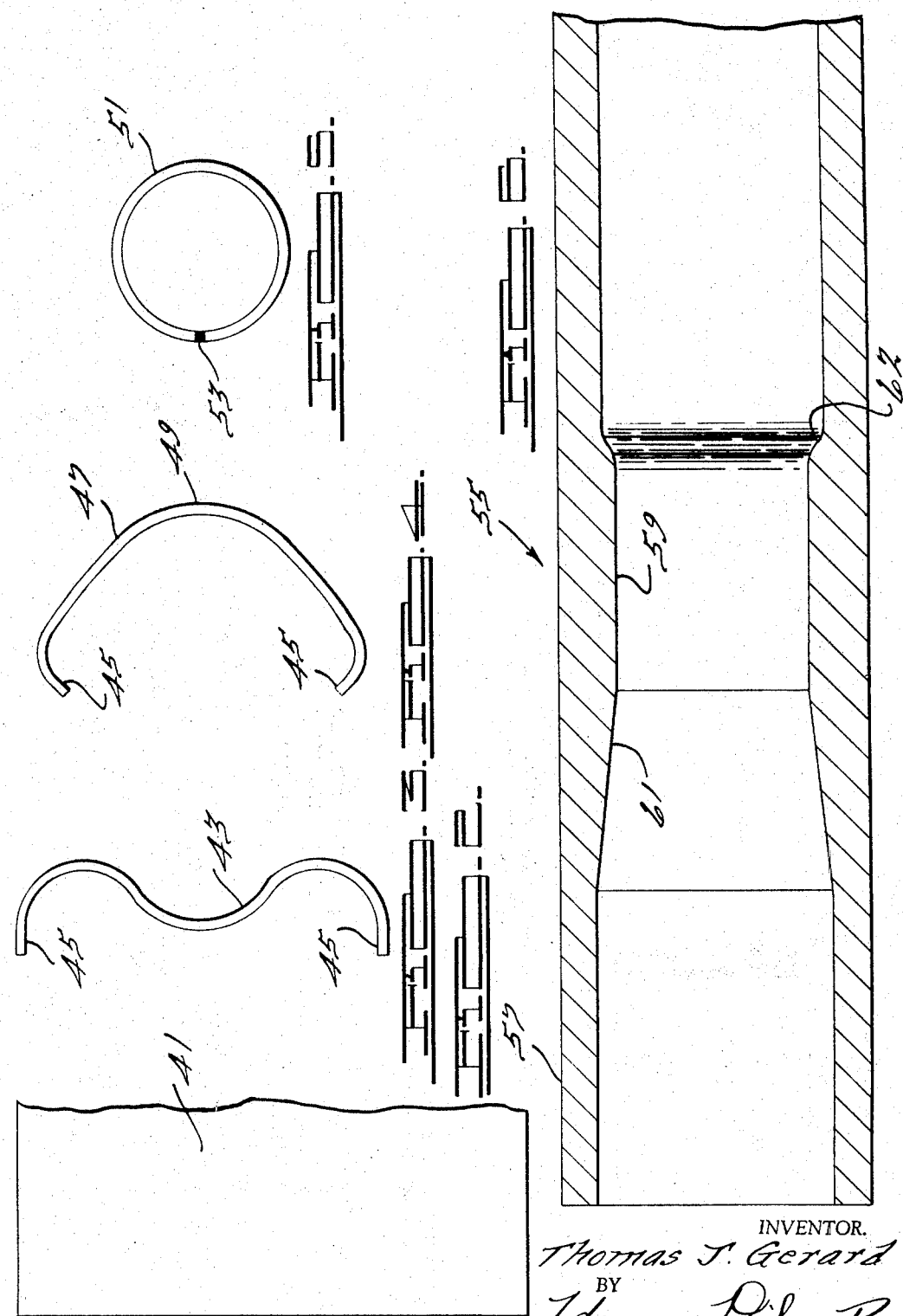

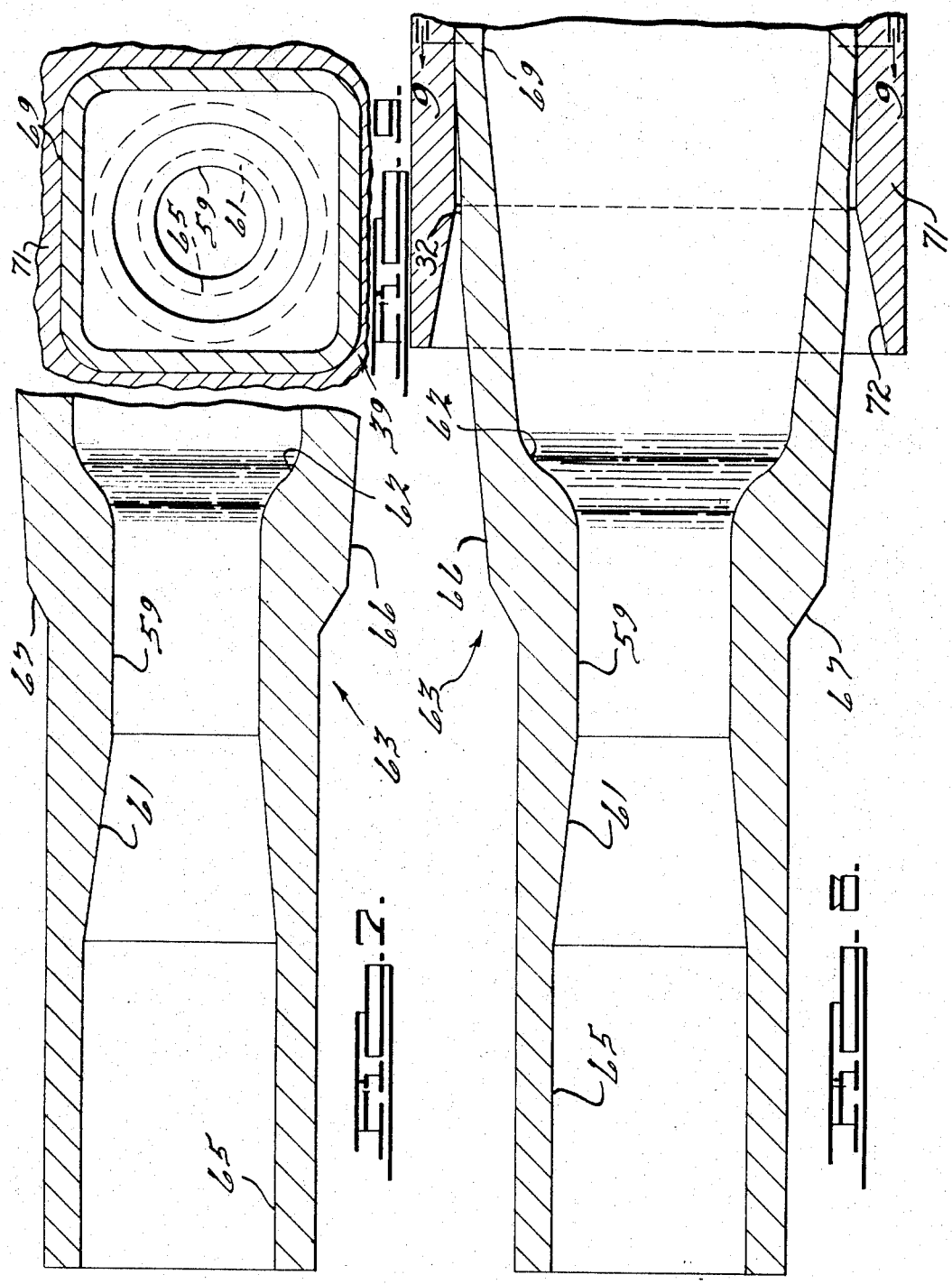

3,453,720
METHOD OF MAKING AXLES
Thomas J. Gerard, East Detroit, Mich., assignor to Fruehauf Corporation, Detroit, Mich., a corporation of Michigan
Filed May 5, 1966, Ser. No. 547,814
Int. Cl. B60b 35/00
U.S. Cl. 29—480                    1 Claim

ABSTRACT OF THE DISCLOSURE

A rear axle housing for supporting nondriven wheels is formed from a flat sheet and rolled into a cylindrical tube with the abutting edges welded. The ends of the tube are swaged toward the midportion to increase the thickness thereof and these portions along with adjacent unworked portions of the midsection are swaged toward the axis to decrease the diameter and increase the wall thickness. Thereafter the entire midsection is worked to produce a square section in a single operation.

---

It is desirable that axle tubes of the type to which the present invention relates, rather than being formed from seamless tubing, be formed from a flat sheet of rolled metal stock bent along a longitudinal axis and having its longitudinal edges abutted and welded together forming a generally cylindrical tube. This results in a substantial initial reduction in materials cost and the welded tube meets all the necessary requirements of strength, durability, etc.

Another economic factor in this area is the desirability of utilizing minimum thickness stock in forming these axle tubes. Thus, the final tube form is not of a single diameter; rather, it consists of stepped diameter and tapered portions adapted to receive and/or position various vehicle wheel, brake and suspension components. In addition, strength requirements along the length of the axle tube differ according to the stresses imposed during use, making the material thickness and/or axle tube shape required vary at different locations along this length.

It is desirable then to provide a method of making axle tubes which satisfies all the existing requirements as to size, thickness and shape and one which utilizes less costly materials and forming steps.

Main objects of the present invention, therefore, are a method of making axle tubes from a strip of flat stock of minimum thickness using relatively simple and less costly forming steps and wherein the resulting axle tube possesses all the necessary size, shape and strength requirements.

Further objects include a method of the above character which is substantially continuous and which produces consistent results.

Other objects and advantages of the present invention will become more apparent from a consideration of the following detailed description and claims taken in conjunction with the drawings in which:

FIGURE 1 is a fragmentary view, partly in section, illustrating an axle tube of the present invention in assembly;

FIGS. 2, 3, 4 and 5 illustrate typical initial forming steps used to form a cylindrical tube;

FIG. 6 is an enlarged fragmentary longitudinal sectional view of the tube of FIG. 5 shown after upsetting one end thereof;

FIG. 7 is a view similar to FIG. 6 illustrating the tube after swaging one end thereof;

FIG. 8 is a view similar to FIGS. 6 and 7 illustrating the tube after squaring the mid-portion thereof; and FIG. 9 is a sectional view of FIG. 8 taken along the line 9—9 thereof.

Broadly described, the present invention includes the steps of bending a flat strip of material to generally cylindrical tube formation and welding it along abutting edges, upsetting the outer ends of the tube to thicken it adjacent said ends, swaging said outer ends to reduce the diameter and increase the thickness at said ends and squaring a mid-portion of the tube.

Referring now more specifically to the drawings and particularly FIG. 1, substantially one-half of an axle tube constructed according to the present invention is illustrated generally at 11 and is seen to include a relatively large mid-portion 13 and a reduced outer end 15. A wheel assembly 17 is removably received on the axle tube 11 at its outer reduced end 15, it being understood that another similar wheel assembly (not shown) is positioned on the other end of the axle tube (not shown) which is formed substantially identical to the end 15.

The wheel assembly 17 illustrated includes a hub 19 supported on the tube end 15 by bearings 21 and secured against a tube shoulder 22 by locking means 23. A pair of wheel rims 25 spaced apart by a spacer 27 are held in place on the outer surface of the hub 19 by removable lugs 29. A brake device 31 is positioned on the axle tube 11 at a generally cylindrical surface 32 intermediate the tube mid-portion 13 and the reduced end 15 and is controlled by an operating mechanism 33 supported by the tube mid-portion 13. The vehicle body weight is supported by the axle tube 11, being transferred thereto by a pair of leaf springs 35 (only one of which is shown), the tube 11, in turn, being supported by the wheels. The springs 35 are secured to the large mid-portion 13 of the axle tube 11 by a connecting device 37 and transmit the vehicle weight thereto at this point. Thus, it is necessary that the axle tube mid-portion 13 be strong enough to resist collapsing under the force of the connecting device 37. In addition, it is necessary that the portion of the axle tube 11 between the reduced ends 15 be sufficiently strong to resist bending under the vehicle load.

The axle tube configuration illustrated in FIG. 1 is one determined to provide the necessary strength and most conveniently afford proper positioning of the wheel, brake and suspension components. FIGS. 8 and 9 illustrate this tube at the completion of the forming process of the present invention and before final machining and the invention method is specifically directed to forming this configuration utilizing the least expensive materials and forming method.

Referring now to FIGS. 2–5, it is seen that the axle tube 11 of the present invention is formed from a sheet of rolled steel stock having a thickness such as to produce the desired wall thickness at the tube mid-portion 13. The sheet is cut to a rectangular configuration forming a plate 41 in a suitable manner, such as, for example, by a conventional shearing device.

The plate 41 is formed to a tubular configuration by bending around a cylindrical die to the shape shown at 51 in FIG. 5 and the abutting ends of the plate 41 are welded together as at 53. Alternatively, the plate 41 may first be formed to a generally sinusoidal configuration, as shown at 43 in FIG. 3, having relatively straight ends 45 by pressing the plate 41 between complementary dies having a configuration conforming substantially to the sinusoidal plate configuration shown in the figure. Multistage forming dies for developing tubes from plate stock are known, and since they form no part of the present invention are not illustrated here. The plate thickness remains substantially the same during this step. If the latter method is used, the sinusoidal plate 43 is formed to a generally C-shaped configuration as shown at 47 in FIG. 4 by bending the sinusoidal plate 43 in reverse fashion about the center thereof and may be carried out by the use of suitable complementary shaped die presses. The C-shaped plate 47 has a middle arcuate section 49 formed substantially on the same radius as that of the completed tube shown at 51 in FIG. 5.

To form the C-shaped plate 47 into the tube 51, a pair of semicylindrical dies is brought together around the plate forcing the ends 45 together after which they are welded as at 53. The resulting product here is the cylindrical tube 51 of uniform diameter and thickness throughout its length and the cost thereof is substantially less than that of a seamless tube.

As described above, the vehicle weight is imposed on the axle mid-portion 13 through the springs 35 and the axle 11 is supported at its ends 15 by the wheels 17 so that it is necessary that the portion of the axle tube 11 between its reduced ends 15 be strong enough to resist bending under these forces. Since the axle portion between the mid-portion 13 and the ends 15 has a smaller moment of inertia than the mid-portion 13 because of its smaller lateral dimension, it has been determined that this portion of the axle tube 11 need be relatively thicker in cross section than the tube mid-portion 13. Thus, according to the present invention, the outer end areas of the tube 51 are heated to forging temperatures and upset by driving a male die into each end of the tube. This die (not shown) has a major diameter slightly larger than the internal diameter of the tube 51 and is provided with a conically shaped tapered end. The upsetting operation is performed on one end of the tube 51 at a time and the tube mid-portion is supported by a female gripping die (not shown). The configuration and dimensions of the male die (not shown) and the distance it is moved during the upsetting operation is such as to form the tube outer ends to the configuration shown at 55 in FIG. 6. As shown there, a portion of the tube metal thickness is pushed inwardly of the tube outer end 57 forming a thickened area 59. Since the male die (not shown) used in this upsetting step has a tapered end, it results in a tapered area 61 adjacent the thickened area 59. This tapered area 61 together with the outer tube end 57 illustrates substantially the configuration of the male die used.

The thickened area 59 extends inwardly of the tube end 57 and toward the mid-portion 13 of the finished axle tube 11 terminating at an area 62 which area also represents the inner boundary of the tube area heated to the forging temperatures during the upsetting process. Although a temperature gradient exists inwardly of the area 62 during the upsetting process, this portion of the tube remains substantially unformed and unaffected at this stage.

The next forming operation of the present invention is to swage the tube ends from the tube mid-portion 13 outwardly to reduce the tube diameters and increase the wall thicknesses to that shown in FIGS. 7–9. Again, only one end of the tube has been illustrated, it being understood that the other end is formed in identical fashion to that illustrated according to the present invention. This swaging step also elongates the tube end somewhat. Conventionally, the swaging operation is performed by a plurality of radially reciprocating hammer-like dies, each of which has an arcuate face conforming to the desired final shape of the swaged portion. Thus, by repeatedly striking the tube end 57 with these dies, the tube diameter is decreased gradually until the desired size and shape are attained. Preferably, the swaging dies form the tube ends to the size shown at 65 in FIGS. 7 and 8 and in addition, form the surface 32, shown in FIG. 8, upon which the brake device 31 seats. Connecting the ends 65 and the adjacent surfaces 32 is a gradually tapered area 66 and a sharply tapered area 67 so that the segmented arcuate swaging dies are of a length and together have a configuration substantially that of the portion of the tube 39 shown in FIG. 8 extending from the tube mid-portion 13 to the outer end 65. Swaging dies of this general type and appropirate drive means therefor are generally well known in the art and are not illustrated nor described further here.

The tube structure resulting from this swaging operation is shown generally at 63 in FIGS. 7 and 8 wherein the tube outer end 65 is smaller in diameter than the tube outer end 57 seen in FIG. 6, but has a greater wall thickness and is slightly longer. The tapered areas 66, 67 also have a smaller diameter and an increased thickness and the overall tube length has been increased accordingly.

After this swaging operation is completed, the tube 63 is then ready for the next operation where the mid-portion is driving through a square female die 71 to form the square mid-portion 13. The tube 63 is heated during this stage and the die 71 has a lateral internal dimension slightly less than the outer diameter of the original tube 51 and is constructed to square the unformed tube mid-portion without substantially altering the wall thickness thereof. The die is preferably flared outwardly at 72 at its leading end for easy passage of the tube 63 therethrough and progressively squares the tube mid-portion as it passes therethrough forming the configuration 39 illustrated in FIGS. 8 and 9 and having a square mid-portion 69.

When the tube 39 emerges from the squaring die or rolls, it is ready for the final forming and finishing steps to provide the necessary seats, shoulders, keyways, etc. for accurately locating and retaining the wheel and brake assembly components thereon. The details of these portions will, of course, vary from one installation to another according to particular desires, needs, etc. and are formed accordingly. They do not form a part of the present invention and therefore the steps involved are not described here. It is to be understood that the particular details shown in FIG. 1 are for illustration purposes only.

For exemplary purposes here only, the following is a typical example of the materials and conditions attendant to performing the present invention. Thus, a standard axle tube is formed using a rectangular plate 41 having a thickness of about ⅜ inch, a length of about 87½ inches a width of about 17½ inches and constructed from steel having 30% carbon, 1.20% manganese, 0.25% silicon and the balance iron. The tube 51 formed from this plate has an outer diameter of about 5$^{31}\!/_{32}$ inches and a wall thickness of ⅜ inch.

During the upsetting process, the tube end 57 is heated to a forging temperature of about 2375° F. and is enlarged to about 6¹⁄₁₆ inches O.D. The thickened area 59 has a forged thickness dimension of about ⅞ inch and the area 62 is spaced about 9½ to 10 inches from the outer tube end.

In the swaging process, the outer tube end 65 is reduced to an O.D. of about 3⅝ inches and the wall thickness at this end returns to about ½ inch. The thickened area 59 outward of the taper 67 has a thickness dimension of about 1³⁄₁₆ inch while inward of the taper 67, it is about 1⁵⁄₁₆ inches and has an O.D. of about 4⅜ inches. The O.D. gradually increases toward the tube mid-portion reaching about 4⅞ inches at area 32. The tube is about 5 inches wide at the square mid-portion 69 formed in the squaring sequence described in which the tube mid-portion is heated to a temperature of about 950° F. to 1000° F. The tube thickness gradually decreases from the thickened area 59 inwardly and reaches about ⅜ inch at the squared portion 69.

By the present invention, there has been provided an improved axle tube forming process calculated to fulfill the objects set forth hereinabove, and while a preferred embodiment of the present invention has been illustrated and described above, various additions, substitutions, modifications and omissions may be made thereto without departing from the spirit of the invention as encompassed by the appended claim.

What is claimed is:
1. A method of forming a nondriven tubular axle which includes the steps of: forming a flat strip of material to a generally cylindrical tube, welding the abutting edges of the formed tube, heating the outer ends of the tube to a forging temperature for a length on which an upsetting operation is to be performed, upsetting the heated outer ends of the tube toward the midportion thereof to thicken the walls of said ends, swaging said upset outer thickened ends toward the central axis of the tube to reduce their diameter and further increase the wall thickness and changing at the same time the diameter and wall thickness of an unworked portion of the midsection of the tube adjacent to said outer ends, heating and squaring the entire midportion of the tube between the swaged ends in a single operation to increase the strength thereof without substantially changing the wall thickness.

References Cited

UNITED STATES PATENTS

| | | | |
|---|---|---|---|
| 1,010,004 | 11/1911 | Wales | 301—124 |
| 1,991,988 | 2/1935 | Spatta | 29—477 |
| 2,124,406 | 7/1938 | Spatta | 301—124 |
| 2,133,091 | 10/1938 | Gettig | 301—124 |
| 2,165,472 | 7/1939 | Friedman | 301—124 |
| 2,192,560 | 3/1940 | Riemenschneider | 29—477 X |
| 2,256,065 | 9/1941 | Urschel et al. | 72—377 X |
| 2,685,479 | 8/1954 | Buckendale | 301—124 |
| 3,037,818 | 6/1962 | Scheel | 301—124 |

JOHN F. CAMPBELL, *Primary Examiner.*

J. L. CLINE, *Assistant Examiner.*

U.S. Cl. X.R.

301—124